(12) United States Patent
Johnson et al.

(10) Patent No.: US 9,487,661 B2
(45) Date of Patent: Nov. 8, 2016

(54) BIODEGRADABLE FIRE RESISTANT FOAM

(71) Applicant: Multi, Inc., Aspen, CO (US)

(72) Inventors: Kenneth LeRoy Johnson, Aspen, CO (US); Tyler Santomaso, Aspen, CO (US)

(73) Assignee: MULTI, INC., Aspen, CO (US)

( * ) Notice: Subject to any disclaimer, the term of this patent is extended or adjusted under 35 U.S.C. 154(b) by 0 days.

(21) Appl. No.: 14/938,098

(22) Filed: Nov. 11, 2015

(65) Prior Publication Data
US 2016/0075889 A1 Mar. 17, 2016

Related U.S. Application Data

(62) Division of application No. 14/485,345, filed on Sep. 12, 2014, now Pat. No. 9,193,876.

(51) Int. Cl.
*C09D 5/18* (2006.01)
*C09D 189/00* (2006.01)
*C09D 101/28* (2006.01)
*C08K 3/32* (2006.01)
*C08K 5/41* (2006.01)
*C09D 101/26* (2006.01)

(52) U.S. Cl.
CPC . *C09D 5/18* (2013.01); *C08K 3/32* (2013.01); *C08K 5/41* (2013.01); *C09D 101/26* (2013.01); *C09D 101/28* (2013.01); *C09D 101/286* (2013.01); *C09D 189/00* (2013.01); *C09D 189/005* (2013.01); *C08K 2003/325* (2013.01)

(58) Field of Classification Search
CPC .............................. C09D 5/18; C09D 189/005
See application file for complete search history.

(56) References Cited

U.S. PATENT DOCUMENTS

| 2,514,310 | A | 7/1950 | Busse et al. |
|---|---|---|---|
| 3,213,052 | A | 10/1965 | Lowes |
| 3,513,114 | A | 5/1970 | Hahn et al. |
| 5,251,398 | A | 10/1993 | Balassa |
| 6,638,621 | B2 | 10/2003 | Anderson |
| 6,740,250 | B2 | 5/2004 | Greiner et al. |
| 8,133,476 | B2 | 3/2012 | Tancredi et al. |
| 2002/0171068 | A1 | 11/2002 | Erismann et al. |
| 2005/0217537 | A1 | 10/2005 | Knipe |
| 2013/0299202 | A1 | 11/2013 | Sinunu |

FOREIGN PATENT DOCUMENTS

WO 2004/112907 12/2004

OTHER PUBLICATIONS

"A Firefighter's Guide to Foam" (2004) Retrieved from www.kedde-fire.com-a-firefighter39s-guide-to-foam-kidde-fire-fighting-6170.pdf.

*Primary Examiner* — Peter F Godenschwager
(74) *Attorney, Agent, or Firm* — Swanson & Bratschun, L.L.C.

(57) ABSTRACT

The instant invention is a fire protectant composition comprising water, a surfactant, a water-soluble polymer, casein, and a calcium salt. The compositions can be applied to materials such as wood in advance of a fire, and after application, the compositions are capable of retaining their fire protectant capacities for days, weeks or even months. This fire protectant composition is also biodegradable and nontoxic. It is also easily removed from the combustible material by a water wash once the fire danger is passes. If burned, the composition forms a "skin" which can be peeled off or removed by some other method such as pressure water spray or mechanical brushing.

5 Claims, 7 Drawing Sheets

BIODEGRADABLE FIRE RESISTANT FOAM

RELATED APPLICATIONS

This application is a divisional of U.S. patent application Ser. No. 14/485,345, filed Sep. 12, 2014, entitled "Biodegradable Fire Resistant Foam", which is incorporated herein by reference in its entirety.

TECHNICAL FIELD

The present invention is directed to fire protective foams particularly adapted for use in providing a protective coating to materials applied in advance of a fire to prevent or reduce fire or heat damage.

BACKGROUND

Wildfires in the United States have increased in both frequency and size due to factors such as climate change and droughts, leading to increased dryness in forest soils and vegetation. Additionally, the trends include suburban sprawl which has caused more people to live and recreate in wildland areas, increasing the risk of human-caused fires and also increasing the risk of damage to structures placed into wildland areas. Further, forestry practices since 1900 include suppression of natural fires resulting in many wildland forests becoming more dense with trees and brush. Thus, fires become more destructive.

In many cases, wildland fires burn for many days or even weeks or months. The direction of the fire can be generally predicted and homeowners in the potential path of the fire can be warned and asked to evacuate. Generally, protecting structures in wildlands includes firefighters and homeowners constructing fire breaks, as well as firefighters or homeowners spraying water onto flammable structures in advance of a fire. Water has certain advantages in firefighting by cooling flammable materials and also displacement of oxygen that is necessary for combustion of fuel. However, once homeowners are evacuated, they are unable to continue spraying water onto their structures.

Water evaporates quickly from dry materials. Further, continuously spraying water on combustible materials such as a home is labor-intensive, taking up firefighter's time that is better spent elsewhere, and dangerous to firefighters as well when the fire is nearby.

It would be desirable to provide to homeowners (and firefighters) with a fire protectant product that can be applied to potentially combustible materials in advance of a fire or evacuation order, which would also stay intact on the combustible material for a period of days to weeks, and provide excellent fire protection during that entire time without further attention or application. It is also desirable that the fire protectant product would retain its fire protecting function after application, even after drying or dehydration of the product. It would also be desirable that the fire protectant product would be biodegradable and nontoxic, and also that it can be easily removed from the combustible material by a water wash once the fire danger is passes, or easily removed from the material once it has been combusted.

Firefighting foams have been used for many years. Firefighting foams can work by suppressing and preventing air from mixing with flammable vapors, separating flames from the fuel's surface, and cooling the fuel and its surface through the action of water in the form. The foam is creating by mechanically mixing air with a surfactant and other materials in water.

Hydrolyzed protein surfactant foams are known for fighting fires and are made from hydrolyzed granular keratin proteins (hoof and horn meal, chicken feathers, etc.). They include stabilizing additives and inhibitors to prevent corrosion, resist bacterial decomposition and to control viscosity. Fluoroprotein foams have fluorochemical surfactants which enhance performance by providing faster knockdown and better fuel tolerance. Film forming fluoroprotein foam (FFFP) that are designed to combine the fuel tolerance with increased knockdown power. Aqueous film forming foams AFFF provides fast knockdown of hydrocarbon fuels. Alcohol resistant film forming fluoroprotein foams (AR-FFFP) are produced from protein foam, fluorochemical surfactants and polysaccharide polymers. They are capable of producing a tough membrane that separates the foam from the fuel and prevents the destruction of the foam blanket.

However, none of the foams currently available provide the combination of properties to make a fire protectant product that can be applied to potentially combustible materials in advance of a fire or evacuation order, that will remain intact on the combustible material for a period of days to weeks, and provide excellent fire protection during that entire time without further attention or application, and which is also biodegradable, nontoxic, and can be easily rinsed off when fire protection is no longer needed.

The present invention is directed toward overcoming one or more of the problems discussed above.

SUMMARY OF THE EMBODIMENTS

Various modifications and additions can be made to the embodiments discussed without departing from the scope of the invention. For example, while the embodiments described above refer to particular features, the scope of this invention also included embodiments having different combination of features and embodiments that do not include all of the above described features.

In one embodiment, the present invention includes a fire protectant composition, comprising: water, a surfactant, a water-soluble polymer, casein, and a calcium salt. In some embodiments, the surfactant is sodium dodecyl sulfate (SDS), the water soluble polymer is carboxymethylcellulose (CMC), the calcium salt is $Ca_3(PO_4)_2$. The amount of SDS can be in an amount of about 20 g/L to about 65 g/L, the amount of CMC can be in an amount of from about 30 g/L to about 82 g/L, the amount of $Ca_3(PO_4)_2$ can be in an amount of 110 g/L to about 220 g/L, and the casein can be in an amount of between about 25 g/L to about 75 g/L.

The present invention also includes a method to prevent fire damage to a material, comprising: applying the composition of the invention to a material prior to application of any heat or flame, wherein the composition is capable of preventing fire damage when heat or flame is applied to the material. The composition can be applied in a ratio of about 100-150 square feet per gallon of composition, and applied prior to the application of heat or flame, including up to one hour previous, one day previous, three days previous, or a week or more previous.

Methods of the invention also include a method of making compositions of the present invention, which includes the steps of adding CMC powder to water and mixing until the CMC is fully hydrated; and adding the surfactant, the casein, and the calcium salt and mixing until fully mixed.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

Figure 1:
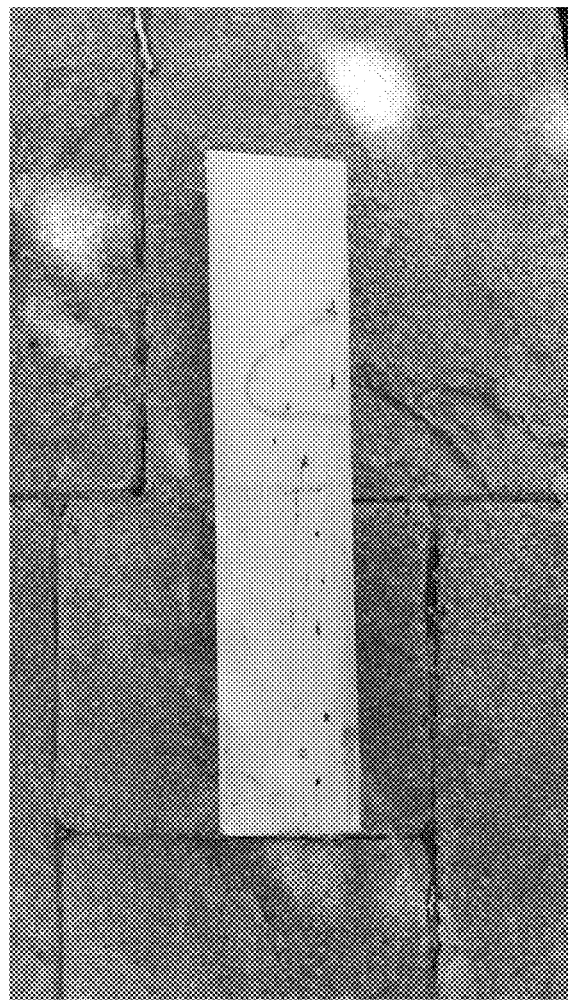
FIG. 1 shows an untreated and unburned wood sample.

In general, the instant invention relates to fire-protectant composition, e.g., a foam that can be sprayed or applied on surfaces in advance of a fire, even days or weeks in advance of the fire, which will protect those surfaces from damage from the fire or heat.

The instant invention is a fire protectant composition which optionally, can be sprayed on combustible materials in advance of a fire. The composition avoids the need for constant water spraying to prevent the materials from catching on fire, which can be difficult or impossible for a resource that can be in scarce supply in remote locations. The foams of the instant invention can also be used in an urban setting where buildings are close together and where heat and flames can spread from building to building.

This fire protectant composition is also biodegradable and nontoxic. It is also easily removed from the combustible material by a water wash once the fire danger is passes. If burned, the composition forms a "skin" which can be peeled off or removed by some other method such as pressure water spray or mechanical brushing.

While various aspects and features of certain embodiments have been summarized above, the following detailed description illustrates a few embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. Several embodiments are described and claimed herein, and while various features are ascribed to different embodiments, it should be appreciated that the features described with respect to one embodiment may be incorporated with other embodiments as well. By the same token, however, no single feature or features of any described or claimed embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

In one embodiment, the present invention includes a fire protectant composition. In one embodiment, the fire protectant composition is a foam, which includes water, a surfactant, a water-soluble polymer, casein, and a calcium salt. The present invention also includes a fire protectant composition, which consists of water, a surfactant, a water-soluble polymer, casein, and a calcium salt; the present invention also includes a fire protectant composition, which consists essentially of water, a surfactant, a water-soluble polymer, casein, and a calcium salt.

"Protect" or "protectant" as used herein can refer to a material, such as a foam as described herein, that either reduces or prevents damage from fire. Damage from fire can include, without limitation, damage from heat, damage from direct combustion, damage from smoke or soot.

The fire protectant composition or foam can contain a surfactant which is useful to enhance or create a foam. Surfactants useful for the present invention include organic compounds which are amphiphilic, containing both hydrophobic groups and hydrophilic groups. The surfactant should be used at above its critical micellular concentration to ensure foaming. Surfactants can include a "tail" or hydrophobic component which can include a hydrocarbon chain, a fluorocarbon chain, or siloxane chain, for example. Anionic surfactants contain anionic functional groups at their head, such as sulfate, sulfonate, phosphate, and carboxylates; these include ammonium lauryl sulfate, sodium lauryl sulfate (SDS, sodium dodecyl sulfate) and the related alkyl-ether sulfates sodium laureth sulfate, also known as sodium lauryl ether sulfate (SLES), and sodium myreth sulfate. Anionic surfactants also include carboxylates such as alkyl carboxylates. Cationic surfactants contain cationic functional groups at their head, such as a primary amine or permanently changed quaternary ammonium cations, such as alkyltrimethylammonium salts, cetylpyridinium chloride (CPC), benzalkonium chloride (BAC), benzethonium chloride (BZT), 5-bromo-5-nitro-1,3-dioxane, dimethyldioctadecylammonium chloride, cetrimonium bromide, dioctadecyldimethylammonium bromide, docusates such as dioctyl sodium sulfosuccinate, perfluorooctanesulfonate (PFOS), perfluorobutanesulfonate, linear alkylbenzene sulfonates (LABs). Nonionic surfactants have nonionic head groups such as polyoxyethylene glycol alkyl ethers, polyoxypropylene glycol alkyl ethers, polyoxyethylene glycol octylphenol ethers, polyoxyethylene glycol alkylphenol ethers, glycerol alkyl esters, polyoxyethylene glycol sorbitan alkyl esters, poloxamers.

In one embodiment, the surfactant is sodium dodecyl sulfate (SDS).

It has been found that amounts to use of the surfactant are what are necessary to form adequate foams. In other words, surfactant can be evaluated by its ability as a foam-forming agent. A wide range of amounts of surfactant can be used in the instant invention as described above. The amount of non-SDS surfactant should be adjusted to give equivalent foam-forming activity as is present in the amounts of SDS given herein. In one embodiment, where the surfactant is SDS, the amount to use is about 2 cups of SDS per gallon of water, or about 43 g/L. Amounts to use can range from about 20 g/L to about 65 g/L. Amounts to use include from about 20 g/L to about 65 g/L, from about 25 g/L to about 60 g/L, from about 30 g/L to about 55 g/L, from about 35 g/L to about 50 g/L, from about 40 g/L to about 45 g/L. Other amounts include greater than about 20 g/L, greater than about 25 g/L, greater than about 30 g/L, greater than about 35 g/L, greater than about 40 g/L, or less than about 45 g/L, less than about 50 g/L, less than about 55 g/L, less than about 60 g/L, less than about 65 g/L. In alternative measurements, the amount of SDS to use is between about 1 cup of dry measure SDS powder per gallon and about 3 cups dry measure SDS powder per gallon.

The fire protectant foam also contains a water-soluble polymer. Without being bound by theory, it is believed that the water soluble polymer acts as a thickener, phase and emulsion stabilizer (enhancing foam persistence), and water-holding agent.

Any known water soluble polymer which can enhance foam persistence can be used in the present invention. Such polymers include hydrocolloids which include water swellable polymers and colloidal materials which yield gel or viscous solution. Suitable polymers include polysaccharide polymers which contain sugar units with anionic functionality such as carboxyl or sulfate groups. Some examples of these sugar units are glucuronic acid, pyronic acid, gluconic acid, galactose sulfate and sugar units unique to specific gums. In addition to naturally occurring anionic functionality, synthetically modified polysaccharides are also suitable such as carboxymethyl cellulose. Representative examples of suitable water soluble polymers also include the following: xanthan gum, algin, welan gum, gellan gum, gum arabic, gum tragacanth, carrageenan, rhamsan gum, carboxymethyl cellulose, polysaccharide PS-7 and modified anionic starches.

In one embodiment, the water-soluble polymer is carboxymethylcellulose, also known as sodium carboxymethyl cellulose. Different preparations may have different degrees of substitution of the carboxymethyl groups, but it is generally in the range 0.6-0.95 derivatives per monomer unit.

Mixtures with other optional polysaccharides may be used and added to the foam to improve foam stability by decreasing drainage, or to make the concentrate more cost effective, or act synergistically with the primary polymer to increase foam stability. These coadditives are non-functional polysaccharides (nonionic) made up of sugar units such as glucose, mannose, anhydroglucose, galactose, rhamnose, and galactopyranose. Synthetically modified anionic polysaccharides to render them non-ionic such as propylene glycol alginate, or cationic such as modified starch also apply. Examples of such optional polysaccharides are guar gum, locust bean gum, hydroxyethyl cellulose, hydroxypropyl cellulose, agar, propylene glycol alginate, scleroglucan and starch.

It has been found that amounts to use of the water soluble polymer are what are necessary to stabilize adequate foams, and/or provide adequate thickening. A wide range of amounts of water soluble polymer can be used in the instant invention as described above. The amount of non-CMC surfactant should be adjusted to give equivalent stabilization and/or thickening activity as is present in the amounts of CMC given herein. Where the surfactant is CMC, amounts to use can include about 1 cup per gallon, or about 42 g/L. Amounts to use can range from about 30 g/L to about 82 g/L. In one embodiment, it is about 41 g/L. Amounts to use include from about 30 g/L to about 82 g/L, from about 32 g/L to about 75 g/L, from about 34 g/L to about 70 g/L, from about 36 g/L to about 65 g/L, from about 38 g/L to about 60 g/L. Other amounts include greater than about 30 g/L, greater than about 35 g/L, greater than about 40 g/L, or less than about 85 g/L, less than about 80 g/L, less than about 75 g/L, less than about 70 g/L, less than about 65 g/L, less than about 60 g/L, less than about 55 g/L, less than about 55 g/L, less than about 50 g/L, or less than about 45 g/L. In alternative measurements, the amount of CMC to use is between about ¾ cup of dry measure CMC powder per gallon and about 2 cups dry measure CMC powder per gallon.

In other embodiments, water-soluble polymer or CMC that is pre-swelled may be used in place of dry water soluble powder or CMC. Amounts to use should be adjusted to provide equivalent amounts to the amounts provided herein for use of dry polymer.

The fire protectant composition or foam also includes a calcium salt. The calcium salt is useful for obtaining and forming the foam and stabilizing and forming a layer which protects the flammable material. It also provides heat resistance to the foam. Suitable calcium salts include, but are not limited to, calcium chloride, calcium lactate, calcium sulfate, calcium carbonates, calcium phosphates, such as monocalcium phosphate, dicalcium phosphate anhydrous, dicalcium phosphate dehydrate, α-tricalcium phosphate, octacalcium phosphate and tetracalcium phosphate, calcium glutareate, calcium malate, calcium citrate, calcium gluconate, calcium glycerophosphate, calcium fumarate, calcium hydroxide, calcium oxide and combinations thereof. In one embodiment, the calcium salt is $Ca_3(PO_4)_2$ (calcium phosphate tribasic).

It has been found that amounts to use of the calcium salt can vary. A wide range of amounts of calcium salt can be used in the instant invention as described above. The amount of non-$Ca_3(PO_4)_2$ should be adjusted to give equivalent fire resistance activity as is present in the amounts of $Ca_3(PO_4)_2$ given herein. Where the calcium salt is $Ca_3(PO_4)_2$, amounts to use can be about 164 g/L, or about 3 cups per gallon. The amounts to use can range from about 110 g/L to about 220 g/L. Amounts to use include from about 110 g/L to about 220 g/L, from about 120 g/L to about 210 g/L, from about 130 g/L to about 200 g/L, from about 140 g/L to about 190 g/L, from about 150 g/L to about 180 g/L, or about 155 g/L to about 170 g/L. Other amounts include greater than about 110 g/L, greater than about 120 g/L, greater than about 130 g/L, greater than about 140 g/L, greater than about 150 g/L, greater than about 160 g/L, or less than about 220 g/L, less than about 210 g/L, less than about 200 g/L, less than about 190 g/L, less than about 170 g/L, or less than about 170 g/L. In alternative measurements, the amount of $Ca_3(PO_4)_2$ to use is between about 2 cup of dry measure $Ca_3(PO_4)_2$ per gallon and about 4 cups dry measure $Ca_3(PO_4)_2$ per gallon, or alternatively, about 3 cups.

The fire protectant composition or foam also includes casein. Casein is a milk protein which the instant inventors have found to create a fire-protectant "skin" which provides an effective barrier to burning of the coated combustible material. Casein also provides additional texture to the foam, provides additional surfactant, and helps with adherence of the foam to the combustible material. Casein is the name for a number of related phosphoproteins that are found in mammalian milk, commonly up to 80% of the proteins in cow milk. Casein contains a fairly high number of proline residues, which do not interact. There are also no disulfide bridges. As a result, it has relatively little tertiary structure. It is relatively hydrophobic.

It has been found that amounts to use of casein can vary. A wide range of amounts of casein can be used in the instant invention as described above. Amounts to use can range from about 25 g/L to about 75 g/L. In one embodiment, the amount to use is about 50 g/L, or about 2 cups per gallon. Amounts to use include from about 25 g/L to about 75 g/L, from about 30 g/L to about 70 g/L, from about 35 g/L to about 65 g/L, from about 40 g/L to about 60 g/L, from about 45 g/L to about 55 g/L. Other amounts include greater than about 25 g/L, greater than about 30 g/L, greater than about 35 g/L, greater than about 40 g/L, greater than about 45 g/L, or about 50 g/L, less than about 75 g/L, less than about 70 g/L, less than about 65 g/L, or less than about 60 g/L. In alternative measurements, the amount of casein to use is between about 1 cup of dry measure casein per gallon and about 3 cups dry measure casein per gallon, or alternatively, about 2 cups.

The fire protectant compositions of the instant invention can be used neat, or can be diluted for easier application. Dilutions include one part foam to 0.5 parts water, one part foam to 0.75 parts water, one part foam to one part water, one part foam to 1.5 parts water, one part foam to 2 parts water, one part foam to 3 parts water, one part foam to 4 parts water, one part foam to 5 parts water, one part foam to 6 parts water, one part foam to 7 parts water, one part foam to 8 parts water, one part foam to 10 parts water, or more. When the fire protectant composition is used as a diluted solution, the amount of water is increased which can cause more movement of the foam when the combustible material is heated.

Other components/excipients/additives are optionally included in the fire protectant compositions. For example, materials to balance the pH may be added, such as buffers, acids, bases and the like. Antibacterial components may be added, or components to aid in dissolution and/or dispersion. The foams of the invention may be stored prior to use for any length of time.

In another embodiment, the present invention also includes a method to prevent or reduce fire damage to materials, which includes the steps of applying the compositions of the instant invention to a material prior to application of any heat or flame. The foam then prevents or reduces fire damage from heat or flame from the material.

Suitable materials to apply the composition to include solid surfaces which may or may not be combustible. These surfaces may comprise, without limit, wood, particle board, hardboard, engineered wood, vinyl (polymers, including, without limitation, polyethylene, polystyrene, polyurethane), fiber cement, composites, mixtures thereof, and the like. Exemplary surfaces include home siding, shingles, decks, outbuildings, garages and the like.

The step of applying the composition e.g. foam can be by any methods as known in the art. The composition may be painted on the surfaces or sprayed. If sprayed, the composition may be diluted in an amount that retains the functionality of the composition upon application and is sprayable.

The amount of composition e.g. foam to apply to obtain the fire-protectant properties includes wherein the foam is applied in a ratio of about 100-150 square feet of surface per gallon of undiluted foam. However, the ratio foam to surface can be adjusted depending on the dilution of the foam (more foam per square foot may be desirable where the foam is more dilute), the amount of time fire protection is desired for, the conditions (humid, dry), and the like.

In one aspect of the present invention, the fire protection is immediate and the fire protective composition, while hydrated, is effective at preventing damage to structures from heat or flame. One surprising aspect of the instant invention is that the composition remains protective against damage from heat or flame even after the water in the foam has evaporated. Thus, the protective effect of the composition will remain even hours, days, or even weeks after application, and after the composition has dried. Without being bound by theory, it is believed that the composition, e.g., the foam dries to a "skin" which provides flame and heat protection in the absence of water.

Therefore, in a surprising aspect of the invention, the composition can be applied from mere minutes before exposure of a surface or material to flame and/or heat, or can be applied for up to weeks prior which is convenient during a long evacuation. For example, the composition may be applied more than one hour prior to application of heat or flame, more than five hours prior to application of heat or flame, more than twelve hours prior to application of heat or flame, more than 18 hours prior to application of heat or flame, more than 24 hours prior to application of heat or flame, more than 48 hours prior to application of heat or flame, more than 72 hours prior to application of heat or flame, more than 4 days prior to application of heat or flame, more than 5 days prior to application of heat or flame, more than 6 days prior to application of heat or flame, more than 7 days prior to application of heat or flame, more than 8 days prior to application of heat or flame, more than 9 days prior to application of heat or flame, more than 10 days prior to application of heat or flame, more than 11 days prior to application of heat or flame, more than 12 days prior to application of heat or flame, more than 13 days prior to application of heat or flame, more than 14 days prior to application of heat or flame, more than 18 days prior to application of heat or flame, more than two weeks prior to application of heat or flame, more than three weeks prior to application of heat of flame, more than four weeks prior to application of heat or flame, more than two months prior to application of heat or flame, more than three months prior to application of heat or flame.

In one embodiment, the composition remains protective of a surface against damage from heat or flame after application for at least one hour prior to application of heat or flame, at least five hours prior to application of heat or flame, at least twelve hours prior to application of heat or flame, at least 18 hours prior to application of heat or flame, at least 24 hours prior to application of heat or flame, at least 48 hours prior to application of heat or flame, at least 72 hours prior to application of heat or flame, at least 4 days prior to application of heat or flame, at least 5 days prior to application of heat or flame, at least 6 days prior to application of heat or flame, at least 7 days prior to application of heat or flame, at least 8 days prior to application of heat or flame, at least 9 days prior to application of heat or flame, at least 10 days prior to application of heat or flame, at least 11 days prior to application of heat or flame, at least 12 days prior to application of heat or flame, at least 13 days prior to application of heat or flame, at least 14 days prior to application of heat or flame, at least 18 days prior to application of heat or flame, at least two weeks prior to application of heat or flame, at least three weeks prior to application of heat of flame, at least four weeks prior to application of heat or flame, at least two months prior to application of heat or flame, at least three months prior to application of heat or flame.

In another embodiment, the present invention includes a method for forming a fire protective composition according to the invention. In this embodiment, dry water soluble polymer in appropriate amounts was added to the water and the mixture is stirred for a period of time to fully hydrate the polymer. After swelling of the water soluble polymer, the remaining components may be added in slowly to solution while mixing/aerating solution until a foam is produced.

EXAMPLES

The following examples are provided for illustrative purposes only and are not intended to limit the scope of the invention.

Example 1

The foam formulation of this Example contained, per gallon of water, 2 cups dry volume of sodium dodecyl sulfate (sodium lauryl sulfate) obtained from Chemistry Connection; 1 cup dry volume carboxymethylcellulose (CMC, cellulose gum, obtained from PyroChem Corporation), 3 cup dry volume $Ca_3(PO_4)_2$ (calcium phosphate tribasic) (bone ash, ceramic calcium phosphate tribasic), and 2 cups casein, dry volume (100% casein protein obtained from GNC Corporation). Per gallon, 162 g SDS is added, 154 g CMC is added, 624 g $Ca_3(PO_4)_2$ is added, and 190 g of casein is added. This is the equivalent of 43 g/L SDS, 41 g/L CMC, 164 g/L $Ca_3(PO_4)_2$, and 50.2 g/L casein.

To create the test formula, dry CMC in appropriate amounts was added to the water. Due to the high viscosity of the CMC, the mixture was stirred to fully hydrate the cellulose until an ideal liquid texture was achieved. Following the hydration of the CMC, the SDS and $Ca_3(PO_4)_2$ were also added in slowly to solution while mixing/aerating solution until a foam was produced.

It was found that foams produced from mixtures of CMC, SDS and $Ca_3(PO_4)_2$ did not produce ideal foams as the foam consistency was not appropriate (large droplet size, or bubble visibility) and the foams tended to lose bubbles and volume upon heating, while not properly adhering to surfaces. Thus, the results achieved did not provide long lasting protection and the temperature resistance was not as high.

Adding the casein to the foam with appropriate amounts of CMC, SDS and $Ca_3(PO_4)_2$ resulted in a foam with a thicker whipped-cream like texture without visible droplets (air bubbles).

Example 2

FIG. 1 shows the starting wood sample, including some small knots and imperfections in the wood, and a C shaped marking on one side. The appearance is a standard 2×4 board, light in color, unfinished.

Figure 2:
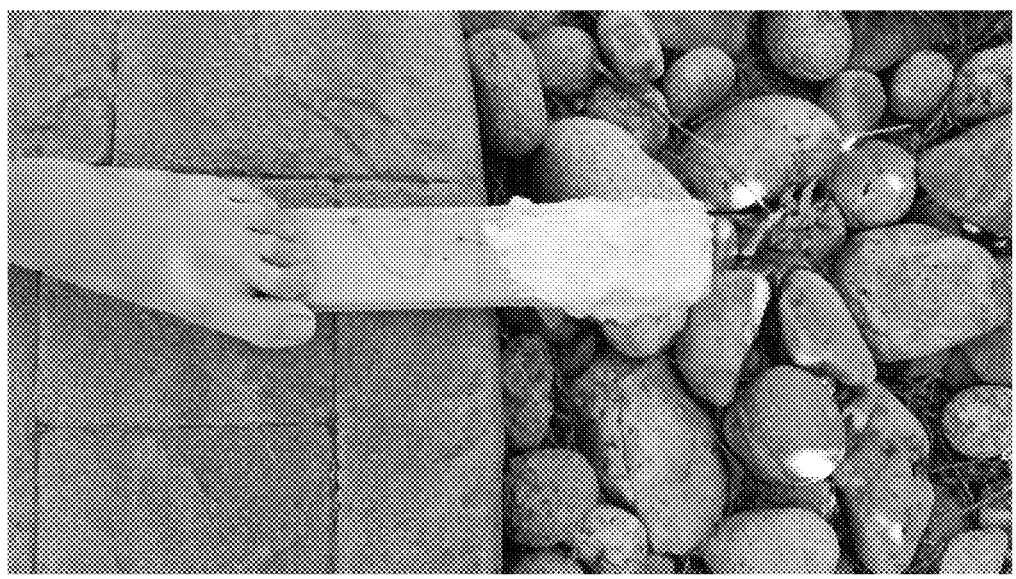
FIG. 2 shows the same board with one half lengthwise treated with (covered in) the fire protectant composition.

FIG. 2 shows the same board with one half lengthwise covered in the protectant of Example 1 around 360 degrees of the surfaces. The coating is about a half centimeter thick in some places, and as little as 1 mm in some of the edge areas. The amount of protectant applied was the equivalent of 1 gallon of the protectant for every 100-150 square feet.

Figure 3:
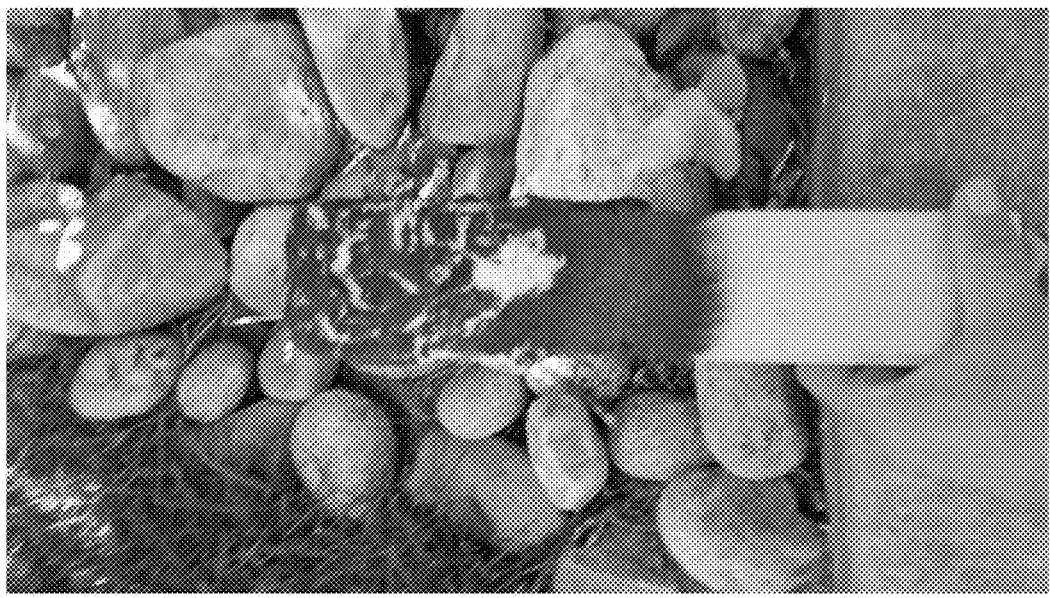
FIG. 3 shows the result on the treated portion of the board after heat was applied using a MAP Gas welding torch to the treated portion of the board.

FIG. 3 shows the results to the board after heat was applied using a MAP Gas welding torch (3000+° F., much higher than wildfires or house fires reach at their peak) around the entire coated surface and top of the board for approximately 6 minutes, or until 1 minute after the skin had formed and expansion had stopped, and no more change from the heat was occurring.

Figure 4:
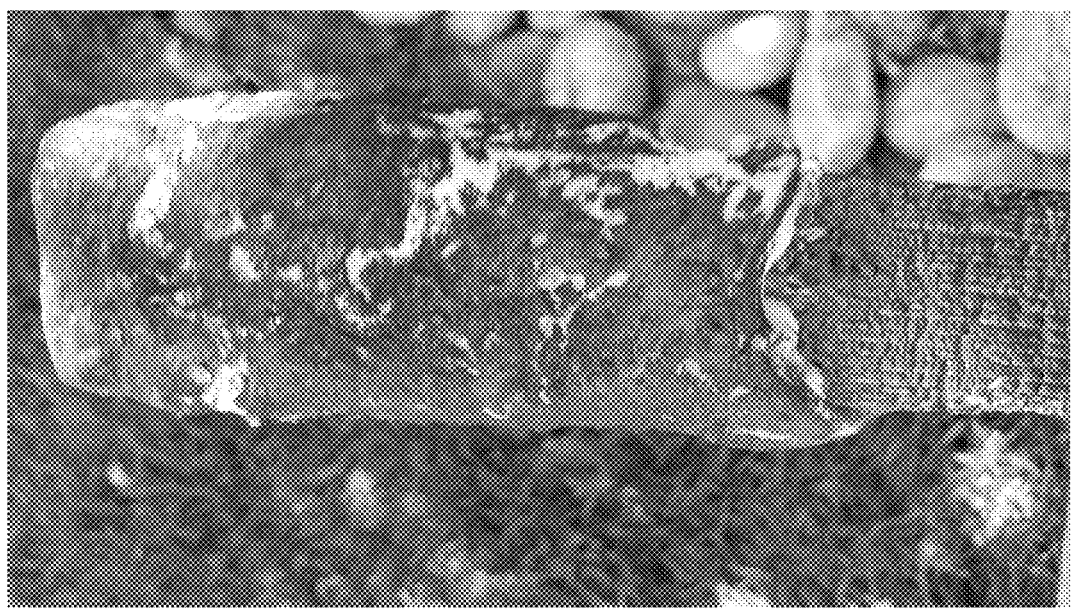
FIG. 4 shows the result on the treated and untreated portion of the board after heat was applied using a MAP Gas welding torch over the whole board.

FIG. 4 shows the results to the board shown in FIG. 3 when additional heat was applied from the bottom of the protected area about 3 inches down the board and around 360 degrees of the surface, using the same heat source, for approximately 30 seconds, or until the full surface had scorched and the board caught fire, forming embers in the wood affecting the structural properties of the board. The results showed that a "skin" that formed around the protected area became a black crust with small cracks through which you can see the unaffected white protectant. Additionally, the coating had expanded as water evaporated out of the solution forming a thicker more, even layer around the wood. The unprotected portions of the wood where heat was applied have been scorched black, with a rippled, warped appearance with areas of ash where the embers were. Also the perimeter/circumference of the wood in the areas that were unprotected has visibly decreased 5 to 20% due to the combustion of materials in the wood.

Figure 5:
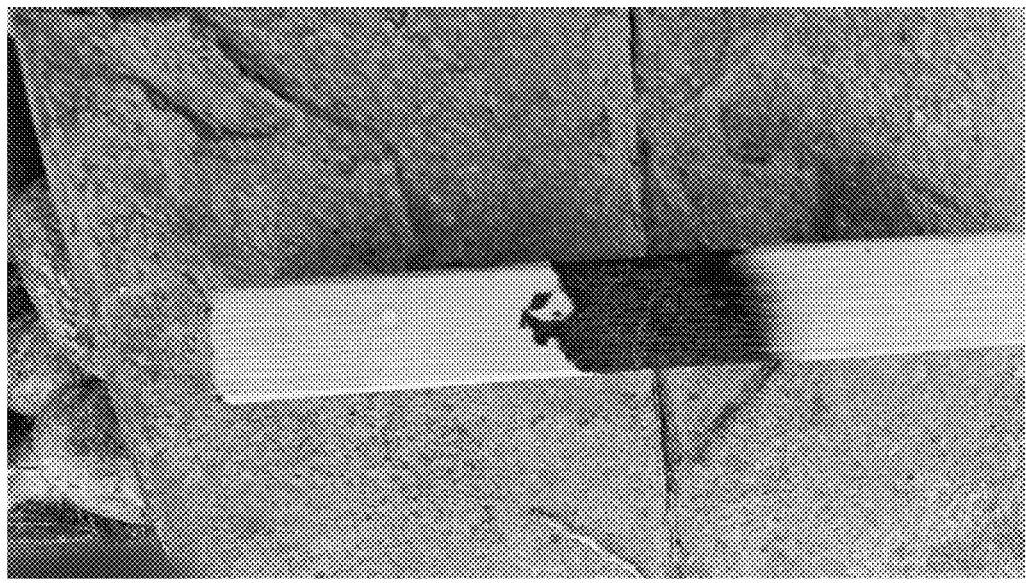
FIG. 5 shows the results after the after the wood of FIG. 4 was washed with a garden watering hose attachment to remove the fire protectant composition.
Figure 6:
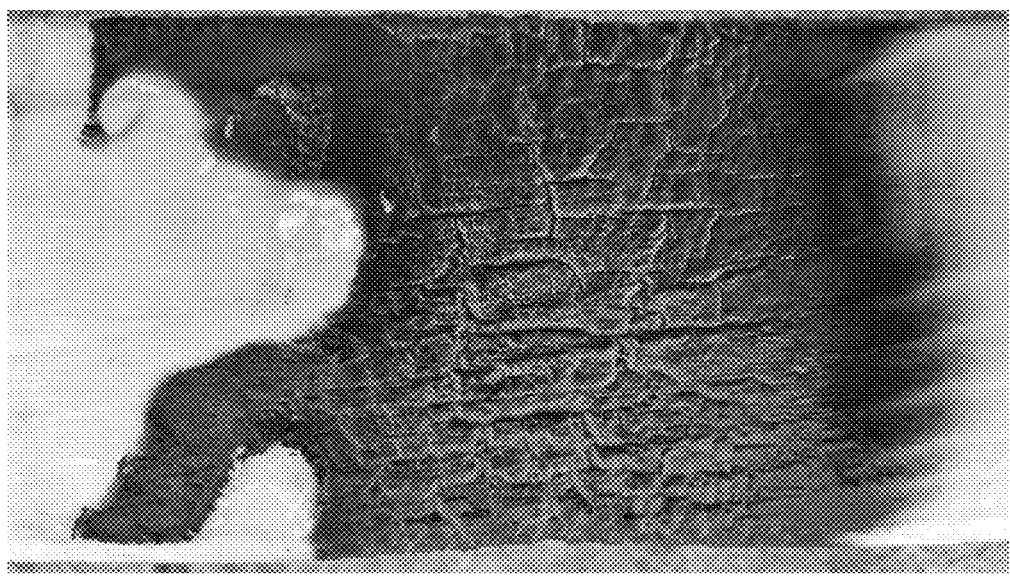
FIG. 6 shows a close-up of the transition between the protected and unprotected portions of the wood following burning, after the burned fire protectant composition was rinsed off.
Figure 7:
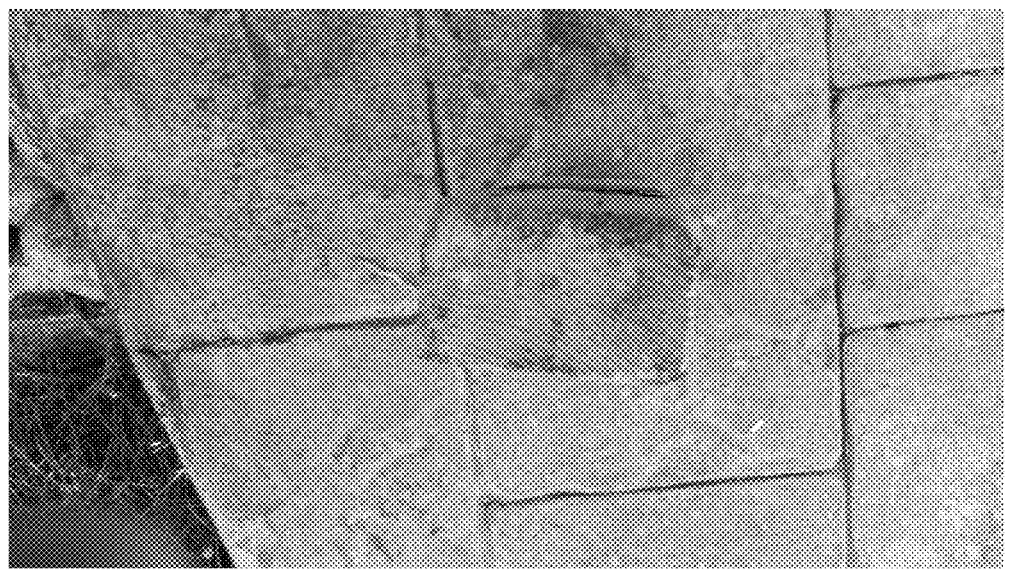
FIG. 7 shows an end-view of the wood of FIG. 6.

FIG. 5 shows the results after the wood of FIG. 4 was quickly washed with a garden watering hose attachment rinsing of all the protectant leaving just the wood. It can be seen that the burned area that was unprotected was completely black and charred, whereas, where the wood was protected, the exact outline of completely unchanged wood can be seen. The bottom third of the board was never coated or subjected to heat, and the color, appearance and texture of the untouched portion and the protected portion are identical. In the middle where the heat was applied the wood is completely black, or ashen and severely damaged. FIG. 6 shows a close-up for the transition between the protected and unprotected wood. FIG. 7 shows an end-view of the wood, showing that the perimeter/circumference of the wood in the areas that were unprotected has visibly decreased 5 to 20% due to the combustion of materials in the wood.

The foam of Example 1, in the tests, showed remarkable adherence to the wood even under very high temperatures, as well as the ability to form a skin, or ash matrix, at the point of contact with heat while protecting the under layer, effectively forming a shell around the surface. These tests were repeated several times to ensure repeatability of results.

The figures demonstrate that the compound provides complete flame protection, even from prolonged exposure to heat drastically higher than it would encounter in a wildfire or structure fire. While at the same time, it washes off with only water and minimal pressure (when dried more pressure may be required) leaving only soap bubbles and harmless minerals and plant materials behind (flushing not required). While the pictures only demonstrate the compounds protective qualities, it can be inferred that its extinguishing properties would be similar, as once applied it occludes the heat and oxygen from the fuel source forming an inert barrier to subsequent exposure to flame in the process.

Example 3

In this example, the foam of Example 1 was applied to wood as according to Example 2. The foam-treated wood was then allowed to dry thoroughly for two weeks. After two weeks, the foam-treated wood was tested according to Example 2 with fire and showed similar if not increased protection, as it had less tendency to flow as the water evaporated during exposure from heat of the fire.

The description of the various embodiments has been presented for purposes of illustration and description, but is not intended to be exhaustive or limiting of the invention to the form disclosed. The scope of the present invention is limited only by the scope of the following claims. Many modifications and variations will be apparent to those of ordinary skill in the art. The embodiments described and shown in the figures were chosen and described in order to explain the principles of the invention, the practical application, and to enable others of ordinary skill in the art to understand the invention for various embodiments with various modifications as are suited to the particular use contemplated. All references cited herein are incorporated in their entirety by reference.

What is claimed is:

1. A fire protectant composition, comprising: water, a surfactant comprising sodium dodecyl sulfate (SDS) in an amount of between 20-65 g/L, a water-soluble polymer comprising carboxymethylcellulose (CMC) in an amount of between 30-82 g/L, casein in an amount of between 25-75 g/L, and a calcium salt comprising $Ca_3(PO_4)_2$ in an amount of between 110-220 g/L.

2. A composition comprising a combustible material coated with the fire protectant composition of claim 1.

3. The fire protectant composition of claim 1, wherein the composition comprises about 43 g/L of SDS, about 41 g/L of CMC, about 164 g/L of $Ca_3(PO_4)_2$, and about 50 g/L of casein.

4. The fire protectant composition of claim 1, wherein the calcium salt is a calcium phosphate salt derived from bone ash.

5. A method of making the fire-protectant composition of claim 1, comprising
   a. adding the water-soluble polymer to water and mixing until the water-soluble polymer is fully hydrated;
   b. adding the surfactant, casein, and the calcium salt to the hydrated water-soluble polymer and mixing until fully mixed to yield the fire-protectant composition.

* * * * *